(12) United States Patent
Berndorfer et al.

(10) Patent No.: US 10,563,689 B2
(45) Date of Patent: Feb. 18, 2020

(54) HOOK IN CONJUNCTION WITH AN ELEMENT TO BE INSERTED INTO THE HOOK INTERIOR

(71) Applicant: easyCLIC GmbH, Grieskirchen (AT)

(72) Inventors: Wolfgang Berndorfer, Natternbach (AT); Johannes Koller, Muenzkirchen (AT)

(73) Assignee: easyCLIC GmbH, Grieskirchen (AT)

( * ) Notice: Subject to any disclaimer, the term of this patent is extended or adjusted under 35 U.S.C. 154(b) by 32 days.

(21) Appl. No.: 15/757,447

(22) PCT Filed: Sep. 7, 2016

(86) PCT No.: PCT/AT2016/060051
§ 371 (c)(1),
(2) Date: Mar. 5, 2018

(87) PCT Pub. No.: WO2017/041125
PCT Pub. Date: Mar. 16, 2017

(65) Prior Publication Data
US 2019/0024698 A1    Jan. 24, 2019

(30) Foreign Application Priority Data

Sep. 10, 2015 (AT) ................................. A 591/2015

(51) Int. Cl.
*F16B 45/02* (2006.01)
*F16B 45/04* (2006.01)
*F16B 1/00* (2006.01)

(52) U.S. Cl.
CPC .............. *F16B 45/02* (2013.01); *F16B 45/04* (2013.01); *F16B 2001/0028* (2013.01); *F16B 2001/0035* (2013.01)

(58) Field of Classification Search
CPC ...... A44B 11/2511; F16B 45/02; F16B 45/04; F16B 2001/0028; F16B 2001/0035;
(Continued)

(56) References Cited

U.S. PATENT DOCUMENTS 7,926,152 B2 * 4/2011 Emenheiser ............ F16B 45/02
24/303
9,228,606 B2   1/2016 Dufresne
(Continued)

FOREIGN PATENT DOCUMENTS

DE        884 591 C    7/1953
FR       2668560 A1    4/1992
(Continued)

OTHER PUBLICATIONS

International Search Report of PCT/AT2016/060051, dated Jan. 17, 2017.

*Primary Examiner* — Robert Sandy
(74) *Attorney, Agent, or Firm* — Liang & Hennessey LLP; Brian E. Hennessey

(57) ABSTRACT

A hook in conjunction with an element to be inserted into the hook interior has an opening, via which opening the element can be inserted into the hook interior, wherein a hook partial region adjoining the opening includes an adhesion element having an adhesion surface directed toward the element and/or the element includes an adhesion element having an adhesion surface directed toward the hook partial region adjoining the opening.

19 Claims, 2 Drawing Sheets

Figure 1:
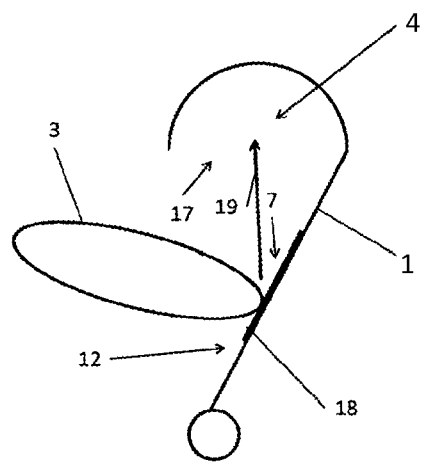

(58) Field of Classification Search
CPC ........... Y10T 24/45346; Y10T 24/2708; Y10T 24/45319; A44D 2203/00
See application file for complete search history.

(56) References Cited

U.S. PATENT DOCUMENTS

| | | |
|---|---|---|
| 2008/0250615 A1 | 10/2008 | Emenheiser |
| 2009/0041557 A1 | 2/2009 | Lin |
| 2010/0016134 A1 | 1/2010 | Reese |

FOREIGN PATENT DOCUMENTS

| | | |
|---|---|---|
| WO | 2013/067641 A1 | 5/2013 |
| WO | 2013/093342 A2 | 6/2013 |

* cited by examiner

HOOK IN CONJUNCTION WITH AN ELEMENT TO BE INSERTED INTO THE HOOK INTERIOR

CROSS REFERENCE TO RELATED APPLICATIONS

This application is the National Stage of PCT/AT2016/060051 filed on Sep. 7, 2016, which claims priority under 35 U.S.C. § 119 of Austrian Application No. A 591/2015 filed on Sep. 10, 2015, the disclosure of which is incorporated by reference. The international application under PCT article 21(2) was not published in English.

The invention disclosed here relates to a hook in conjunction with an element to be introduced into the hook interior, wherein the hook has an opening, through which opening the element can be introduced into the hook interior.

FR2668560 and WO2013067641 respectively disclose a hook (carabiner) for inserting an element into the hook interior.

When introducing an element into the hook the latter has to be introduced through the opening into the hook interior. The invention disclosed in the following addresses the problem of simplifying the process of guiding the element through the opening for the user.

The first secondary objective is achieved by positioning the element in a position adjoining the opening.

According to the invention this is achieved in that a hook portion adjoining the opening comprises an adhesion element with an adhesive surface directed towards the element and/or the element comprises an adhesion element with an adhesive surface directed towards the hook portion adjoining the opening. In this way the element can be held detachably by the adhesion element in a position adjoining the opening.

From the position adjoining the opening, the user can insert the element into the hook interior by overcoming the adhesive force between the hook and the element.

The element can be a ring, an eyelet or a cable. Also the element to be introduced can be an additional carabiner or an additional hook.

The adhesion element can be arranged in a hook portion, by means of which hook portion an element held detachably on the adhesion element can be moved by an essentially linear movement into the hook interior.

The user can apply by hand an essentially linear movement to the element. The element following the essentially linear movement of the hand can deviate slightly during the insertion into the hook interior from the essentially linear movement of the hand of the user. Mainly however, the movement of the element follows the movement of the user in a linear way.

The hook can comprise a first Velcro element as the adhesive element and the element can comprise a second Velcro element.

The hook can have an adhesive surface as the adhesion element.

The hook can comprise a first magnet with a first polarity as an adhesion element, wherein the element can comprise a second magnet with a second polarity. The first polarity and the second polarity are different so that the first magnet attracts the second magnet. The first magnet thus moves a second magnet situated in the range of effect of the magnetic field into the position adjoining the opening.

The invention also includes the fact that the closure element, a magnet or the element to be introduced are made from a magnetizable material.

The hook can comprise a movable closure element, which closure element in its closed position closes the opening, whilst the opening is open in an open position of the closure element for passing through the element.

The closure element can be displaced and/or rotated relative to the hook. From the displaceability and/or rotatability of the closure element, additional types of movement of the closure element adapted to the respective case, such as pivoting or folding the closure element, can be derived by a person skilled in the art. A hook comprising a closure element is known for example as a carabiner, shackle et cetera from the prior art.

The adhesion element can be arranged on the closure element exterior of the closure element or on the hook exterior of the hook portion adjoining the opening.

When using a first magnet as an adhesion element preferably only an element located outside the hook interior is attracted by the first magnet. An element located in the hook interior and thus already inserted into the hook is not affected by the magnetic effect of the first magnet in such an arrangement of the first magnet.

The secondary objective of the invention is to ensure that the element located in a position adjoining the closure element can be inserted into the hook interior by applying force onto the element and onto the hook. The adhesion element is preferably arranged in a hook portion adjoining the opening, so that the element can be moved by a simple, essentially linear movement of the adhesion element into the hook interior.

If the hook comprises a closure element, the user preferably does not need to displace the closure element to insert the element. For the user this simplifies the process of inserting the element, especially as the closure element because of its size cannot be held as easily as for example the hook or the element. The user can also apply a tensile force to the hook and the element via a cable connected to the element or hook.

The closure element can be mounted pivotably about a pivot point, which pivot point is spaced apart from the adjoining position. After positioning the element to be introduced in a position adjoining the closure element, the user pulls the element to be inserted into the hook interior, simultaneously rotating it and opening the closure element. The force applied by pulling the element onto the element creates a moment of force, which moment of force opens the rotatable closure element by rotation.

The displaceable closure element in the adjoining position can have an oblique surface pointing in the direction of the hook interior. The force applied by pulling the element to be introduced causes the displacement of the closure element from the closed position to the open position.

The closure element can be closed by a spring after the introduction of the element.

In the Figures below the following elements are denoted by the prefixed reference numerals. The Figures are only used for illustrating the subject matter of the invention. The Figures should not be considered to be restrictive to the subject matter of the invention.

1 hook
2 closure element
3 element to be inserted
4 hook interior
5 closed position
6 open position
7 a hook portion adjoining the closure element
8 first magnet
9 second magnet 10 adjoining position
11 closure element exterior
12 hook exterior
13 ring
14 pivot point
15 magnetic field
16 eyelet
17 opening
18 adhesion element
19 movement
20 tensile force FIG. 1 shows a first embodiment of the hook according to the invention in conjunction with a ring.

Figure 2:
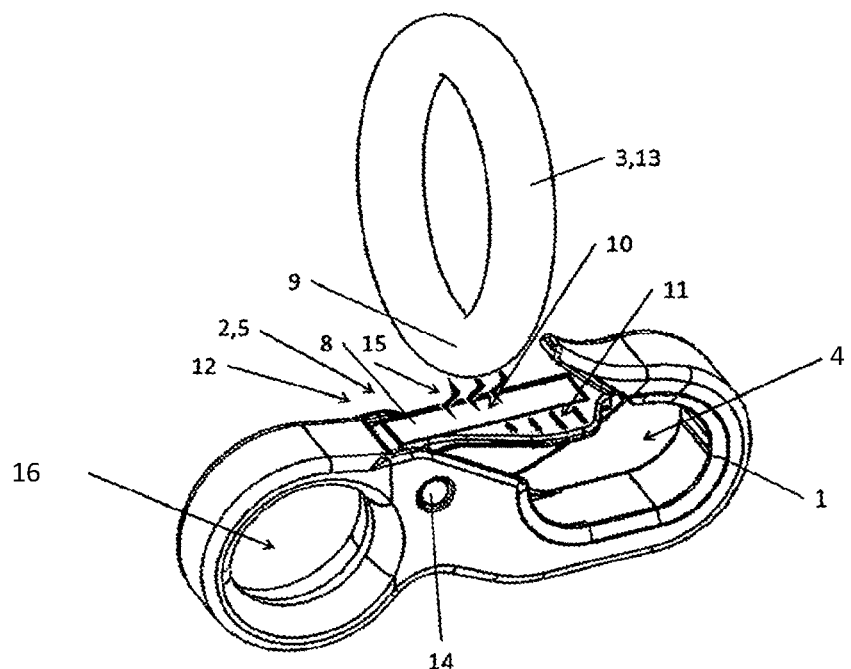
Figure 3:
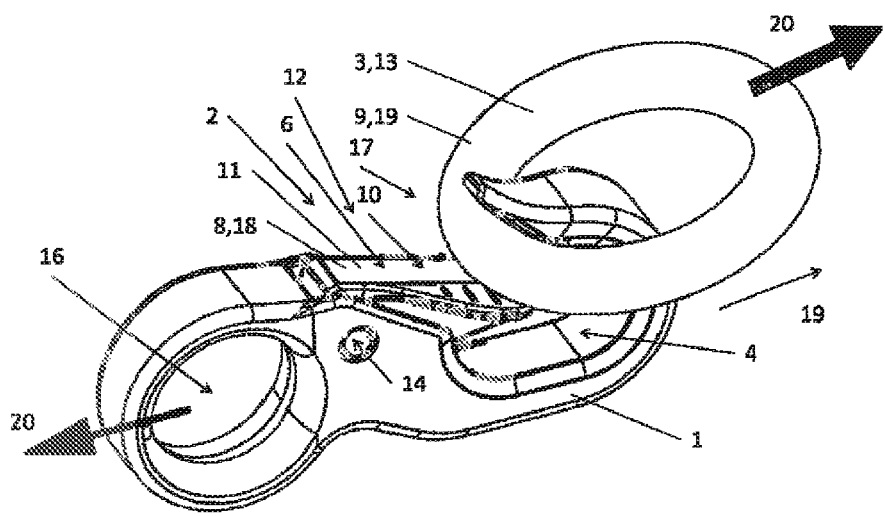

FIG. 2 and FIG. 3 show a second embodiment of the hook according to the invention comprising a rotatable closure element in conjunction with a ring.

FIG. 1 shows a view of a hook 1 in conjunction with an element 3 to be introduced into the hook interior 4. The element 3 to be introduced is a ring 13 in the embodiment shown in FIG. 1.

The hook 1 comprises an opening 17, via which opening 17 the ring 13 can be introduced into the hook interior 4. The hook interior 4 can be defined as the area of the hook 1, which is delimited by a curved area of the hook 1 and the opening 17. An element 3 located in the hook interior 4 and the hook 1 can be pressurized reciprocally with force.

The hook comprises an adhesion element 18, which adhesion element 18 is arranged in a hook portion 7 adjoining the opening 17. In the embodiment shown in FIG. 1 the adhesion element is an adhesive surface, by means of which adhesive surface—as shown in FIG. 1—the element is held detachably in a position 10 adjoining the opening 17. The adhesion element 18 is advantageously arranged in a hook portion 7, by means of which hook portion 7 an element 3 held detachably on the adhesion element can be moved by a linear movement 19 into the hook interior 4.

A person skilled in the art would know that for inserting the ring 13 into the hook interior 4 the sizes of the ring 13 and the opening width have to be coordinated. FIG. 1 shows an advantageous case, in which the ring 13 is larger than the opening width of the hook 1.

FIG. 2 shows a three-dimensional view of a second embodiment of the hook 1 according to the invention comprising a closure element 2 in conjunction with a ring 13 as the element 3 to be inserted into the hook interior 4. The hook 1 and the closure element 2 rotatable about a pivot point 14 have the form of a carabiner, which is known from the prior art. The hook 1 also comprises an eyelet 16.

Similar to a carabiner according to the prior art the closure element 2 can be moved from a closed position 5 shown in FIG. 2 to an open position 6 shown in FIG. 3. The hook 1 and the closure element 2 form a closed geometric form which closed form defines the hook interior 4. An element 3 introduced into the hook interior 4 can only be removed from the hook interior 4 after opening the closure element 2.

The closure element 2 comprises a first magnet 8 with a first polarity directed to the element 3. The ring as the element 3 to be introduced comprises a magnetizable material as a second magnet 9 with a second polarity directed towards the closure element 2. A person skilled in the art would select the first polarity and the second polarity in accordance with current teaching so that the ring 13, as an element 3 to be introduced, is attracted by the first magnet 8 into a position 10 adjoining the closure element 2. The first magnet 8 and the second magnet 9 act as adhesion elements.

The embodiment shown in FIG. 2 is characterized in that the first magnet 8 is arranged on the closure element exterior 11. Thus only one element 3, which is arranged adjacent to the closure element exterior 11, is covered by the effect of the magnetic field 15. The effect of the magnetic field 15 does not extend sufficiently strongly into the hook interior 4 that an element 3 located in the hook interior 4 would be picked up and pulled towards the closure element 2. In this way the use of the carabiner with an element 3 located in the hook interior 4 is not changed by arranging the first magnet 8 in the closure element 2.

FIG. 2 shows the ring 13 immediately before reaching the adjoining position 10, in which position 10 the ring 13 and the first magnet 8 are in contact. The position 10 is still entered in FIG. 2 however. FIG. 2 thus shows the moment at which the element 3 is moved into the position 10 adjoining the closure element 2 by means of magnetism.

FIG. 3 shows the embodiment of the hook 1 shown in FIG. 2 comprising a closure element 2 during the introduction of the element 3 into the hook interior 4 in a linear movement 19. The closure element 3 located in the open position 6 and the hook 1 are spaced apart by an opening 17, through which opening 17 the element 3 is introduced into the hook interior 4.

The closure element 2 is mounted rotatably about a pivot point 14, which pivot point 14 is spaced apart from the adjoining position 10. By means of a tensile force 20, which acts on the one hand on the eyelet and on the other hand on the ring 13, a torque force is created which moves the closure element from the closed position shown in FIG. 2 into the open position shown in FIG. 3. The ring 13 is pulled through the opening 17 into the hook interior, overcoming the magnetic field acting between the first magnet 8 and the second magnet 9. The movement 19 applied to the ring 13 from position 10 to the hook interior 4 is linear, i.e. the movement 19 is not obstructed by any elements of the hook 1.

The closure element is also coupled to a spring, which is not shown in FIG. 2 and FIG. 3, which spring after introducing the element moves the closure element from the open position 6 to the closed position 5.

The invention claimed is:

1. A hook in conjunction with an element to be inserted into a hook interior,
    wherein the hook comprises an opening, through which opening the element can be inserted into the hook interior,
    wherein a hook portion adjoining the opening comprises an adhesion element with an adhesive surface directed towards the element and/or the element comprises the adhesion element with an adhesive surface directed towards the hook portion adjoining the opening, and
    wherein the hook comprises a movable closure element, which closure element closes the opening in its closed position, whereas the opening in an open position of the closure element is open for the passage of the element.

2. The hook in conjunction with according to claim 1, wherein the adhesion element is arranged in the hook portion, from which hook portion the element held detachably on the adhesion element can be moved in a linear movement into the hook interior.

3. The hook in conjunction with the element as claimed in claim 1, wherein the hook comprises a first hook-and-loop fastening element as the adhesion element and the element comprises a second hook-and-loop fastening element.

4. The hook in conjunction with the element as claimed in claim 1, wherein the hook comprises a first magnet as the adhesion element, the element comprising a second magnet.

5. The hook in conjunction with the element as claimed in claim 1, wherein the adhesion element is arranged on a hook exterior of the hook portion or on an exterior of the closure element.

6. The hook in conjunction with the element as claimed in claim 1, wherein the closure element is mounted to be rotatable about a pivot point, which pivot point is spaced apart from an adjoining position.

7. The hook in conjunction with the element as claimed in claim 1, wherein the closure element in an adjoining position has an oblique surface pointing in the direction of the hook interior.

8. The hook in conjunction with the element as claimed in claim 1, wherein after insertion of the element the closure element is closed by a spring.

9. The hook in conjunction with the element as claimed in claim 1, wherein the element is a ring, an eyelet or a cable.

10. A hook in conjunction with an element to be inserted into a hook interior,
   wherein the hook comprises an opening, through which opening the element can be inserted into the hook interior;
   wherein the hook comprises a closure element, which closure element closes the opening in its closed position, whereas the opening in an open position of the closure element is open for the passage of the element;
   wherein an adhesion element comprising an adhesive surface is arranged on an exterior of the closure element;
   wherein the closure element is mounted to be rotatable about a pivot point, which pivot point is spaced apart from the adhesion element; and
   wherein, when the element is positioned at the adhesion element, a tensile force applied to the element causes the closure element to open by rotation and the element to inserted into the hook interior.

11. The hook in conjunction with the element as claimed in claim 10, wherein wherein the hook comprises a first hook-and-loop fastening element as the adhesion element and the element comprises a second hook-and-loop fastening element.

12. The hook in conjunction with the element as claimed in claim 10, wherein wherein the hook comprises a first magnet as the adhesion element, the element comprising a second magnet.

13. The hook in conjunction with the element as claimed in claim 10, wherein the closure element in the adjoining position has an oblique surface pointing in the direction of the hook interior.

14. The hook in conjunction with the element as claimed in claim 10, wherein after insertion of the element the closure element is closed by a spring.

15. The hook in conjunction with the element as claimed in claim 10, wherein the element is a ring, an eyelet or a cable.

16. A hook adapted to conjoin with an element to be inserted into a hook interior, the hook comprising:
   an opening, through which opening the element can be inserted into the hook interior;
   a hook portion adjoining the opening and including a hook exterior;
   a movable closure element, the closure element closing the opening in a closed position, the closure element in an open position enabling passage of the element into the hook interior; and
   an adhesion element arranged on an exterior of the closure element, the adhesion element including an adhesive surface directed towards the element when the element is in an adjoining position outside of the hook interior.

17. The hook according to claim 16, wherein, when the element is held detachably on the adhesion element, the element is adapted to move in a linear movement into the hook interior.

18. The hook according to claim 16, wherein after insertion of the element the closure element is closed by a spring.

19. The hook in conjunction with the element as claimed in claim 18, wherein:
   the closure element is mounted to be rotatable about a pivot point, which pivot point is spaced apart from an adjoining position; and
   the closure element in the adjoining position has an oblique surface pointing in the direction of the hook interior.

\* \* \* \* \*